United States Patent [19]
Asada

[11] Patent Number: 5,513,932
[45] Date of Patent: May 7, 1996

[54] METHOD UTILIZING CAMSHAFT MILLER

[75] Inventor: Koji Asada, Ishikawa, Japan

[73] Assignee: Kabushiki Kaisha Komatsu Seisakusho, Tokyo, Japan

[21] Appl. No.: 199,202

[22] PCT Filed: Sep. 27, 1993

[86] PCT No.: PCT/JP93/01374

§ 371 Date: Mar. 20, 1995

§ 102(e) Date: Mar. 20, 1995

[87] PCT Pub. No.: WO94/07636

PCT Pub. Date: Apr. 14, 1994

[30] Foreign Application Priority Data

Sep. 29, 1992 [JP] Japan .................................. 4-259587

[51] Int. Cl.⁶ .............................. B23C 3/08; B23B 1/00; B23D 37/00
[52] U.S. Cl. ........................... 409/132; 82/1.11; 409/244
[58] Field of Search ................... 29/888.1, 56.5, 29/27 R, 27 C; 82/1.11, 106, 130, 131; 409/131, 132, 220, 197, 244, 203, 213, 217, 165, 166

[56] References Cited

U.S. PATENT DOCUMENTS

| | | | |
|---|---|---|---|
| 4,242,020 | 12/1980 | Schmid | 409/234 |
| 4,624,610 | 11/1986 | Phillips et al. | 409/132 |
| 4,747,236 | 5/1988 | Wedenywski | 409/132 X |
| 4,800,683 | 1/1989 | Sutwür | 82/106 X |
| 5,029,500 | 7/1991 | Ruby | 82/106 X |

FOREIGN PATENT DOCUMENTS

| | | | |
|---|---|---|---|
| 3516100 | 11/1986 | Germany | 82/106 |
| 89401 | 7/1981 | Japan | 82/106 |
| 59-115111 | 7/1984 | Japan . | |
| 60-25611 | 2/1985 | Japan . | |
| 60-186309 | 9/1985 | Japan . | |
| 1079362 | 3/1984 | U.S.S.R. | 82/1.11 |
| 1215872 | 3/1986 | U.S.S.R. | 82/1.11 |

*Primary Examiner*—William Briggs
*Attorney, Agent, or Firm*—Wenderoth, Lind & Ponack

[57] ABSTRACT

A method of using a camshaft miller for working a workpiece in which a plurality of journals are provided on the workpiece, cams having the same phases are disposed on both sides of each of the respective journals and a ring is disposed at one end of the workpiece, includes providing a cutter having, at a central portion thereof, a central chip for working a ring and other chips disposed on both sides of the central chip for simultaneously working cams having the same phases, working the cams of the same phases of each of the journals simultaneously with the other chips, subsequently with respect to the journals, and working the ring with the central chip. According to this method, the cams and the ring can be worked by a single working machine and the cams of each set thereof having the same phase can be simultaneously worked, thereby improving the productivity.

3 Claims, 4 Drawing Sheets

METHOD UTILIZING CAMSHAFT MILLER

BACKGROUND OF THE INVENTION

1. Field of the Invention

The present invention relates to a method of using a camshaft miller.

2. Description of the Related Art

In the known art, some types of engine units of, for example, automobiles employ double overhead camshafts (DOHC).

One example of such double overhead camshafts is shown in FIG. 1, in which a pair of cams $C_1$, $C_2$; $C_3$, $C_4$; $C_5$, $C_6$; and $C_7$, $C_8$ for suction and discharge, having the same phase, are provided on both sides of respective one of a plurality of journals $J_1$, $J_2$, $J_3$ and $J_4$ and a ring (fuel cam) $C_9$ for driving a fuel pump is also mounted on one end.

When the double overhead camshaft of the above structure is manufactured, a workpiece provided with the cams $C_1$, $C_2$; $C_3$, $C_4$; $C_5$, $C_6$; and $C_7$, $C_8$ having the same phase on both sides of respective journals $J_1$, $J_2$, $J_3$ and $J_4$ and with the ring $C_9$ at its one end portion is worked by means of a camshaft miller. In conventional technology, there are generally employed a method, as shown in FIG. 2, in which the respective cams $C_1$–$C_8$ and $C_9$ are subsequently worked by using a single cutter a and a method, as shown in FIG. 3, in which the adjacent two cams such as $C_1$ and $C_2$ of these cams are simultaneously worked by using a double cutter b.

However, according to the former working method using the single cutter a, many processes are involved and, accordingly, much time is required for working and finishing one workpiece. It is thus difficult to achieve improved productivity using any form of this method.

On the other hand, according to the latter working method using the double cutter b, in a case where the ring $C_9$ is worked by the double cutter b, one of the cutter elements of the cutter b interferes with the ring $C_9$ and the working is not executed precisely. In order to prevent this problem, it is necessary to work the ring $C_9$ by another means, thus being troublesome and hence inconvenient.

SUMMARY OF THE INVENTION

An object of the present invention is hence to provide a working method using a camshaft miller capable of effectively working cams and a ring by single cutter means.

A method of using a camshaft miller for working a workpiece in which a plurality of journals are provided on the workpiece, cams having the same phases are disposed on both sides of each of the respective journals and a ring is disposed at one end of the workpiece, includes providing a cutter having, at a central portion thereof, a central chip for working a ring and other chips disposed on both sides of the central chip for simultaneously working cams having the same phases, working the cams having the same phases of each of the journals simultaneously with the other chips, subsequently with respect to the journals, and working the ring with the central chip.

According to this method, the cams and the ring can be worked by one machine and the cams having the same phases are simultaneously worked, thereby improving the productivity.

Further, it is to be noted that it is possible to work first the cams and then the ring or vice versa to attain the same functions and effects.

BRIEF DESCRIPTION OF THE DRAWINGS

The present invention will be better understood hereunder from the following detailed description and accompanying drawings showing an embodiment of the present invention. It is noted that the embodiment shown in the drawings does not limit the present invention and is used for the sake of explanation and easy understanding thereof.

In the accompanying drawings.

BEST MODE FOR CARRYING OUT THE INVENTION

Hereunder, one embodiment of a camshaft working method using a camshaft miller according to the present invention will be described with reference to FIGS. 4 and 5.

Figure 1:
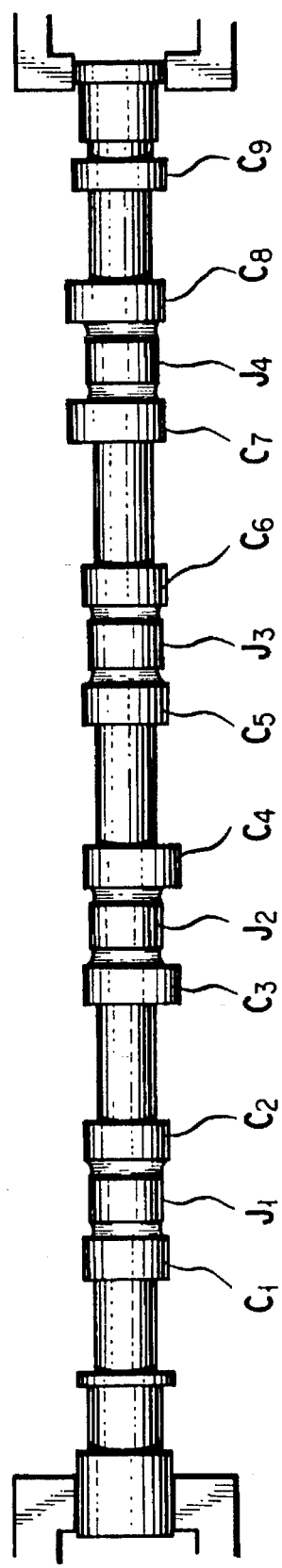
FIG. 1 is a plan view of a double overhead camshaft.
Figure 2:
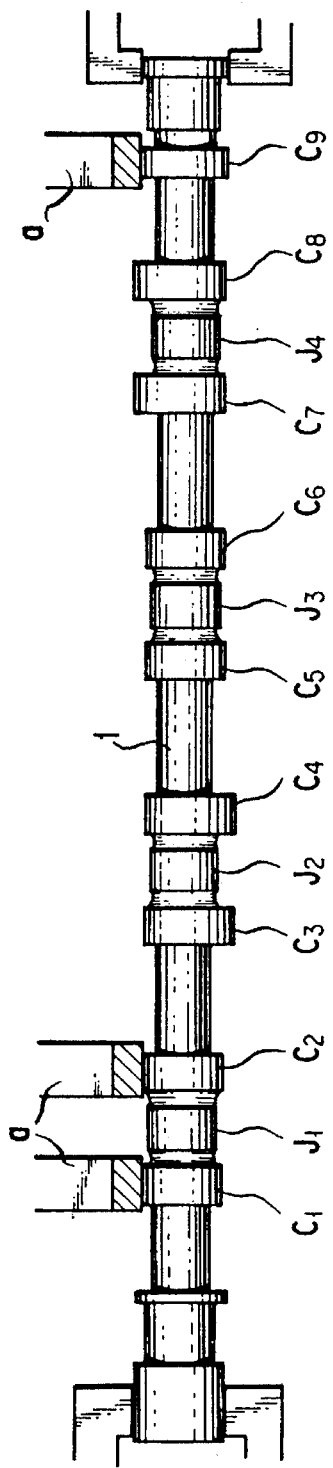
FIG. 2 is a view for explaining one example of a conventional working method.
Figure 3:
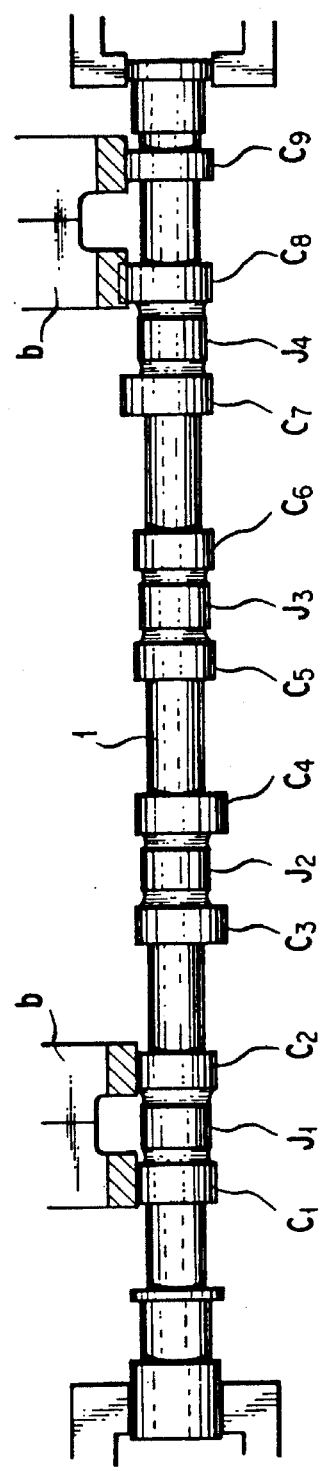
FIG. 3 is a view for explaining another example of a conventional working method.
Figure 4:
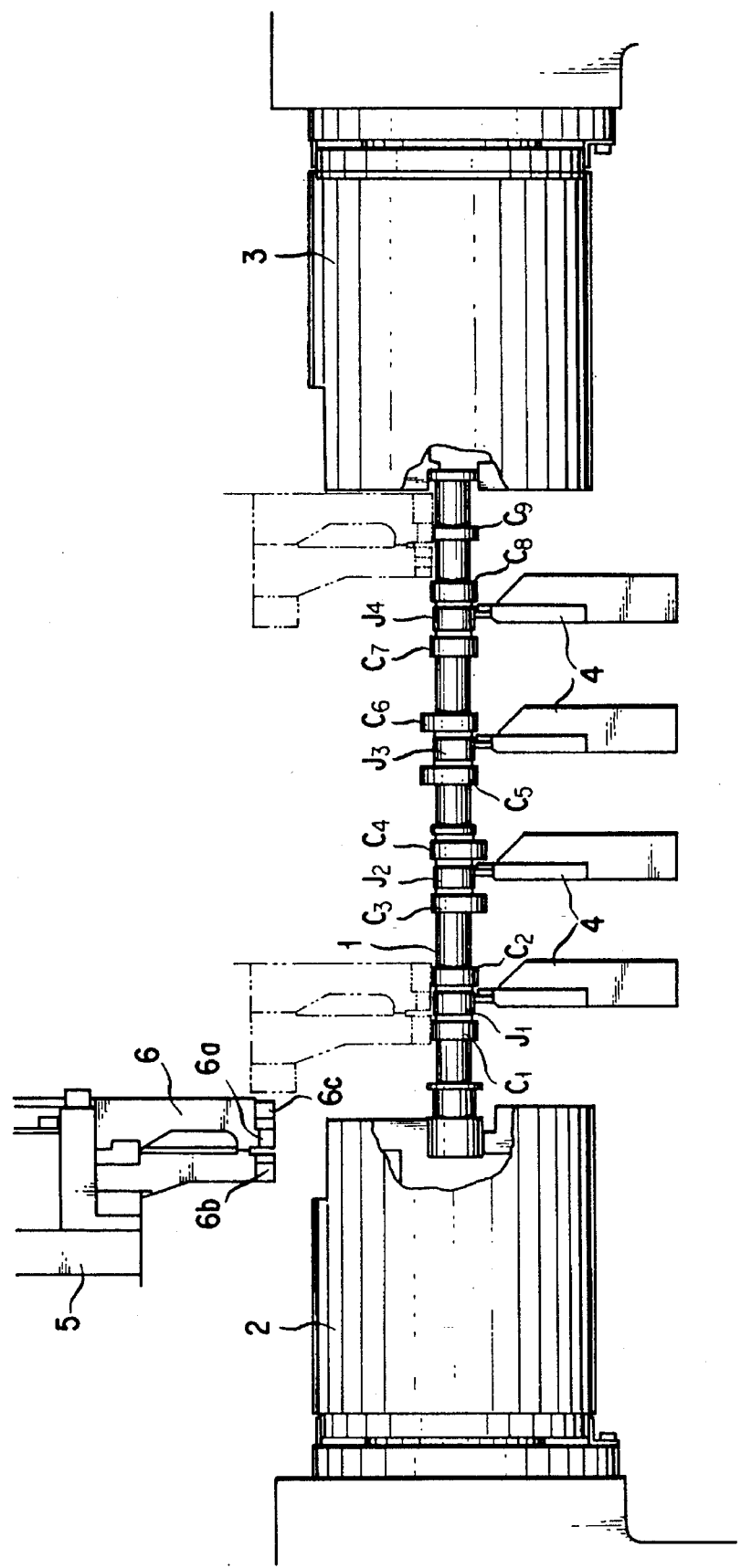
FIG. 4 is a plan view of a camshaft miller utilized for one embodiment of a working method according to the present invention.
Figure 5:
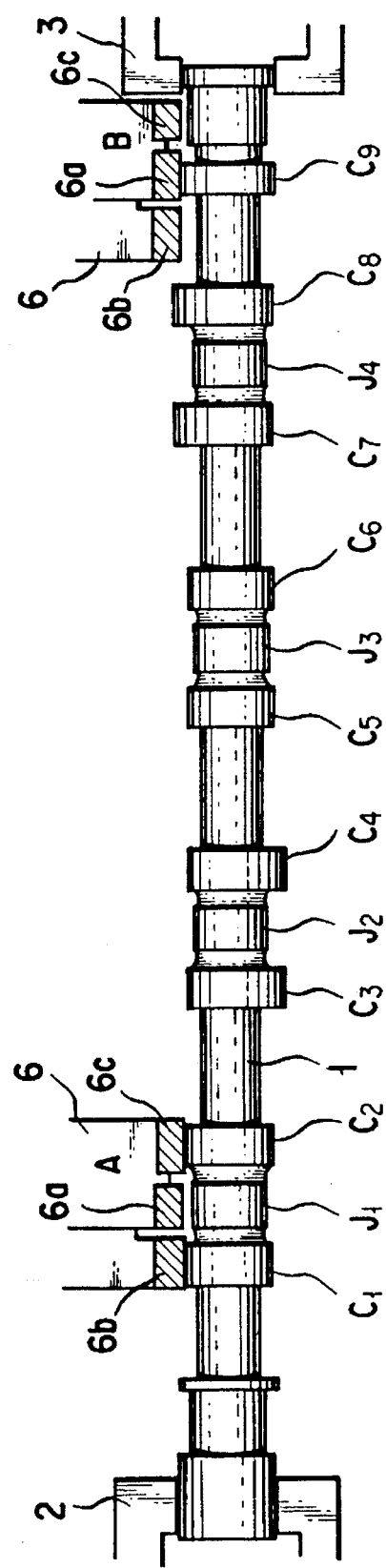
FIG. 5 is a view for explaining the above embodiment.

FIG. 4 is a plan view of a camshaft miller and FIG. 5 is a view for explaining the camshaft working method.

The camshaft miller is, as shown in FIG. 4, provided with chucks 2 and 3 clamping both ends of a workpiece 1, and a plurality of rests 4 supporting journals $J_1$ to $J_4$ of the workpiece 1 from a direction opposite to the cutting direction are disposed between these chucks 2 and 3. Reference numeral 5 denotes a tool holder disposed to be movable along the axial direction of the workpiece 1, and a cutter 6 is mounted to the tool holder 5.

The cutter 6 is of a triple cutter structure in which a chip 6a for working a ring $C_9$ is provided at a central portion of the front end of the cutter 6 and a pair of chips 6b, 6c for simultaneously working cams having the same phases $C_1$, $C_2$; . . . $C_7$, $C_8$ are mounted to both sides of each of the journals $J_1$ to $J_4$ of the work 1.

The working method will be explained hereunder with reference to FIG. 5.

Both ends of the workpiece 1 to be worked are first clamped by the chucks 2 and 3, and the cutter 6 is then moved to a position A in FIG. 5. Under this condition, the workpiece 1 is rotated by the chucks 2 and 3 to first simultaneously work the cams $C_1$ and $C_2$ having the same phase on both sides of the journal $J_1$ by the chips 6b and 6c.

Next, upon the completion of the working of the cams $C_1$ and $C_2$, the cutter 6 is moved to the position of the next journal $J_2$ to perform the working of the cams $C_3$ and $C_4$ on both sides of the journal $J_2$ in the same manner as for the cams $C_1$ and $C_2$. In substantially the same manner, the other cams are worked, and after the cams $C_7$ and $C_8$ on both side of the journals $J_4$ have been worked, the cutter 6 is moved to a position B in FIG. 5. Then, the ring $C_9$ is worked by the central chip 6a. At this working time, the chips 6b and 6c never interfere with the cam $C_8$.

As described above, according to the working method of the present invention, the cutter of the triple cutter structure having the chips at the central portion and on both sides thereof is utilized for first working the cams having the same phases sequentially and finally working the ring by the central chip, so that the cams and the ring can be worked by the single working machine. Accordingly, the method is economical in comparison with the conventional technique in which the cams and the ring are worked by different working machines.

Furthermore, since the cams having the same phases can be simultaneously worked, the cycle time is reduced to about ⅔ in comparison with the case where a single cutter is utilized for working, thus remarkably improving the productivity.

Further, in the described working method, substantially the same functions and effects may be attained even if the order of working the cams and the ring is reversed.

It is to be noted that the present invention is explained hereinbefore with reference to the exemplary embodiment, but it is obvious to those skilled in the art that various changes, deletions and additions with respect to the described embodiment may be made without departing from the subject and the scope of the present invention, and accordingly, it is to be understood that the present invention is not limited to the described embodiment and possesses a scope prescribed by elements recited in the appended claims and a scope equivalent thereto.

I claim:

1. A method of using a camshaft miller for working a workpiece having a plurality of journals, a plurality of sets of cams, the cams of each set having the same phases and being disposed on both sides of a respective one of the journals, and a ring disposed at one end of the workpiece, said method comprising: providing a cutter having, at a central portion thereof, a central chip dedicated to work a ring and other chips disposed on both sides of the central chip at locations where the other chips can simultaneously work the cams having same phases of a respective said set; subsequently with respect to the journals, working all of the cams by steps of simultaneously working the cams having the same phases of each said set with said other chips; and working the ring with the central chip.

2. A method of using a camshaft miller according to claim 1, wherein the cams are worked in advance of the working of the ring.

3. A method of using a camshaft miller according to claim 1, wherein the ring is worked in advance of the working of the cams.

* * * * *